May 11, 1965  M. G. MAVLEOS ETAL  3,182,653
LITHIUM HYDRIDE BODY HEATING DEVICE
Filed Dec. 5, 1961  4 Sheets-Sheet 1

INVENTORS
MICHAEL G. MAVLEOS
JACQUES J. DESY
BY
Leonard H. King
ATTORNEY

INVENTORS.
MICHAEL G. MAVLEOS
JACQUES J. DESY
BY
Leonard H. King
ATTORNEY

May 11, 1965 M. G. MAVLEOS ETAL 3,182,653
LITHIUM HYDRIDE BODY HEATING DEVICE
Filed Dec. 5, 1961 4 Sheets-Sheet 4

INVENTORS
MICHAEL G. MAVLEOS
JACQUES J. DESY
BY
*Leonard H. King*
ATTORNEY

United States Patent Office 3,182,653
Patented May 11, 1965

3,182,653
LITHIUM HYDRIDE BODY HEATING DEVICE
Michael G. Mavleos, Westbury, and Jacques J. Desy, North Babylon, N.Y., assignors to Avien, Inc., Woodside, N.Y.
Filed Dec. 5, 1961, Ser. No. 157,088
2 Claims. (Cl. 126—204)

This invention relates to a portable heat pack for providing warmth and warm air for respiration purposes to personnel exposed to sub-zero atmospheres.

A need exists for means to keep personnel warm while working in arctic and like climes. The effectiveness and efficiency of personnel when actively engaged in extreme low ambient temperature environments can be substantially improved by supplementary heating apparatus incorporated in a suitable sheltering garment system. Ideally, an apparatus designed for this use should be safe, light, easily maintained and serviced. The apparatus should be non-restrictive as to body and limb movement. In addition, the temperature-conditioning system should condition the breathing air of the workman while it maintains the temperature of the air around his body within a comfortable range. Heated suits have long been employed. However, suits employed to date generally rely on the generation of heat during use of the suit such as by a self-contained fuel supply, or require electrical cables connected to a supply source, thus limiting the range movement of the occupant.

The present invention utilizes the principle that as a material changes state from a liquid to a solid, it will give up its heat of fusion at a constant temperature. The system of this invention employs lithium hydride as the heat storage medium.

Lithium hydride is particularly useful in this application as it has a very high heat of fusion, permitting a large quantity of heat to be stored in a light compact body. At standard conditions, it has the following properties:

Heat of fusion _____ 1065 B.t.u./lb.
Melting point _____ 680° C.
Specific gravity _____ .82.

These properties provide a one-hour heat source for 625 B.t.u. to be carried in approximately .6 lb. of material. However, it is preferred to incorporate a 1.0 lb. lithium hydride charge which produces a 67% thermal margin. With this system the heat is provided without dependence on combustion, chemical reaction or electro-chemical source.

Accordingly, an object of this invention is to provide a device for supplying warm air for maintaining body warmth under arctic conditions.

A further object is to provide apparatus for supplying air of suitable temperature for human respiratory purposes under arctic conditions.

A particular object is to provide a portable apparatus for supplying air of suitable temperature for human respiratory purposes under arctic conditions.

An object of this invention is to provide a portable heat storage source employing lithium hydride.

Another object is to provide a portable constant temperature respiratory air source.

Still another object is to provide a rechargeable heat source.

A feature of this invention is the provision of a lightweight heat source.

Another feature of the invention is the provision of a compact portable heat source.

Other objects and advantages of the invention will, in part, be pointed out with particularity and will, in part, become apparent from the following description, in conjunction with the annexed drawing.

Figure 1:
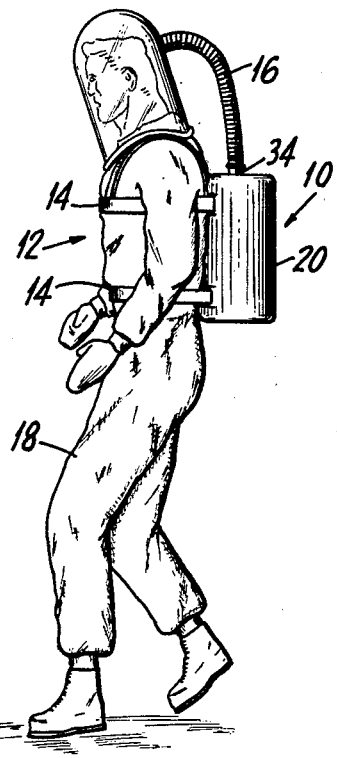
FIG. 1 is a side view of the apparatus as it appears in use carried by a person.
Figure 3:
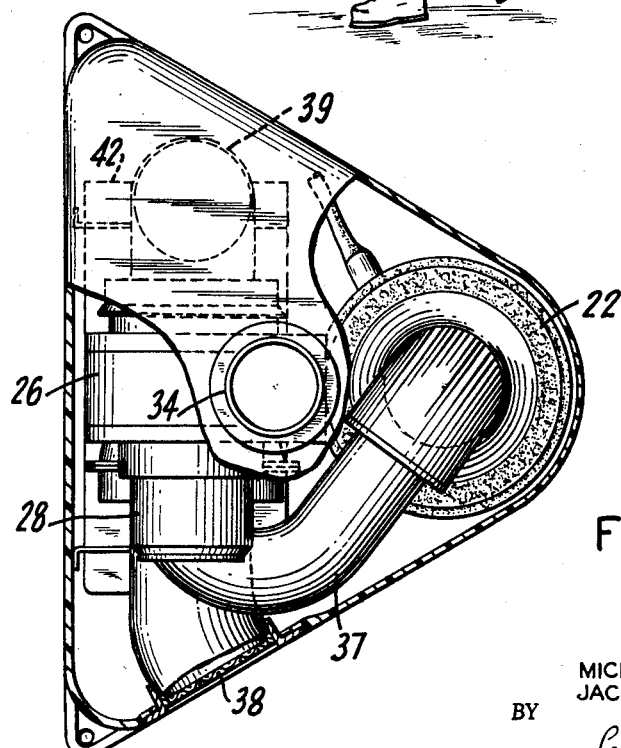
FIG. 3 is a top view with the case partially broken away.

Referring now to FIGS. 1–4, there is shown the apparatus, designated generally by the numeral 10, attached to the body of a person 12 by means of conventional fastening harness 14. A duct 16 provides warm air to a protective garment 18, as explained in detail hereinbelow. The apparatus is housed in a resin-reinforced Fiberglas case 20. Mounted within the case is a heat exchanger 22 containing lithium hydride. Ambient air enters the apparatus through grill 24 (FIG. 4), passes through heat exchanger 22, and under the action of fan 26 driven by motor 28, is brought through duct 37 to plate valve 30 (FIG. 2) and directed to hose 16. A conventional coupling 34 is provided for attachment of the hose 16 to the apparatus outlet port. A second grill 38 serves as an intake for ambient air which is mixed by plate valve 30 to temper the air heated by heat exchanger 22 so that the air passing through duct 39 to fan 26 and ultimately to the protective garment 18 is tempered. If the air were not tempered, local burning would result and the air could not be used for respiration purposes.

Power for operation of fan motor 28 is provided by storage battery 42 by means of cable 44 which plugs into the battery through appropriate plugs to a junction box 46. From junction box 46, a second cable 47 connects by means of a suitable mating plug 49 to fan motor 28.

In a preferred embodiment, the heat exchanger comprises a cylindrical container 25 enclosing lithium hydride 23. Surrounding the cartridge there is an insulting layer 27, preferably a Fiberglas matting, which lowers the heat dissipated to a tolerable level. This insulating layer is generally necessary to avoid heating the air to too high a temperature at normal air consumption levels. However, it is to be understood that for some purposes the insulation can be omitted and that the lithium hydride could even be enclosed in a corrugated can in order to provide more radiating surface if greater heating is desired.

Figure 4:
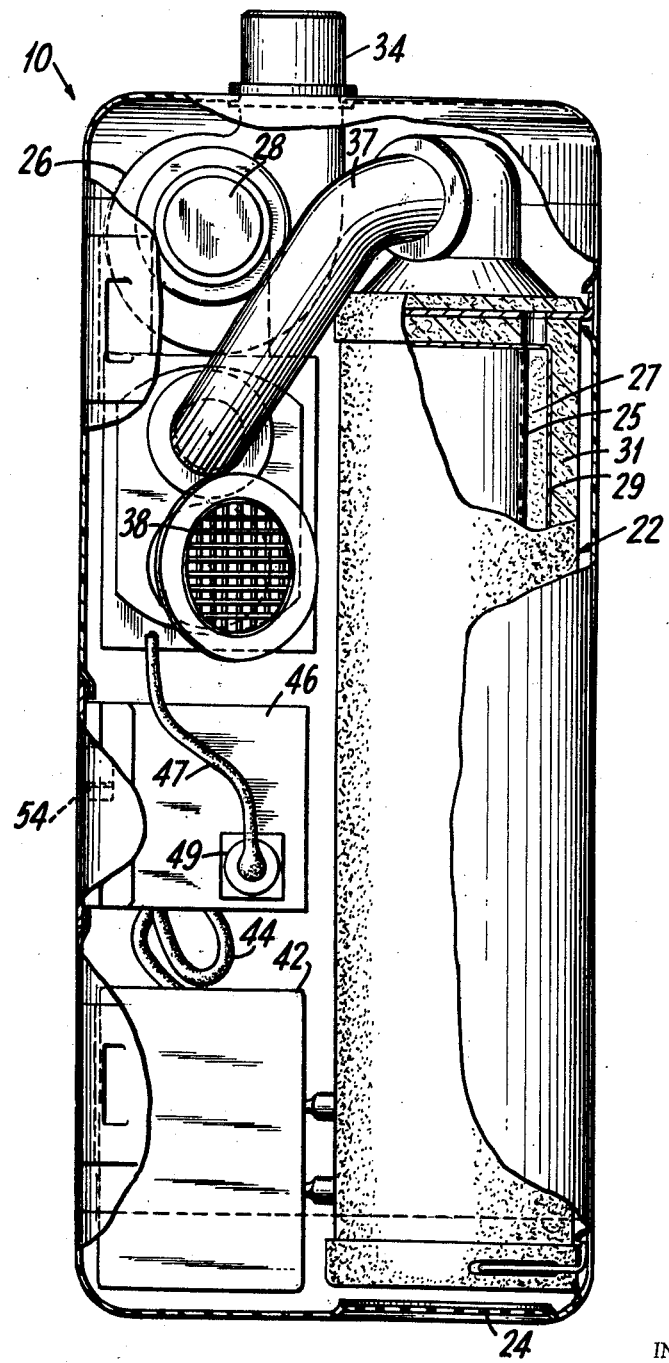
FIG. 4 is a side elevation view with the case partially broken away.

In the above preferred embodiment, coaxial with the container enclosing the lithium hydride is a cylindrical shell 29 of greater diameter (FIG. 4). This is shown surrounded by an insulating layer 31 comprised of a material such as Fiberglas. The ambient air entering through grill 24 is passed through the annular space between the cylindrical container enclosing the lithium hydride, said container being preferably surrounded by an insulating medium, and the cylindrical shell coaxial with the aforementioned container.

Figure 7:
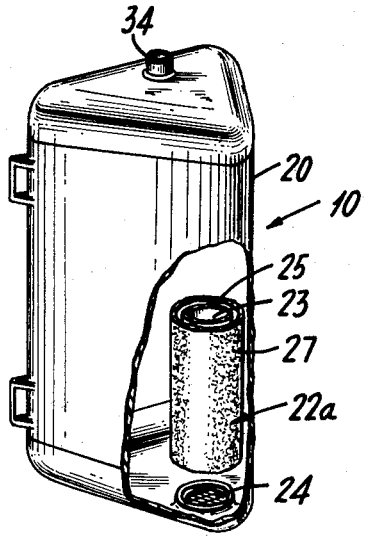
FIG. 7 shows in perspective an alternative embodiment of the heat exchanger with the housing partly broken away.

In the heat exchanger 22a of the alternative embodiment, shown in FIG. 7, the outer cylindrical shell 29 is eliminated, its function being replaced by the Fiberglas case 20, which serves as a plenum chamber and keeps the battery warm so that it may operate at a higher level of efficiency.

Figure 5:
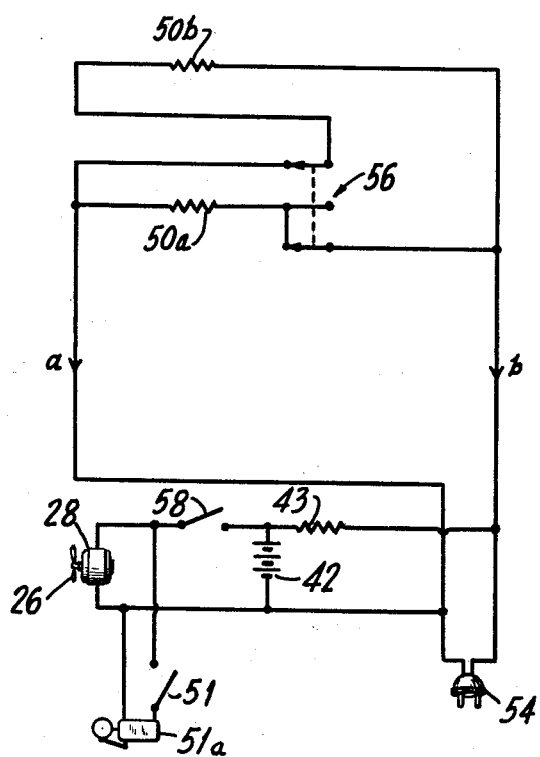
FIG. 5 is a wiring diagram of the charging and sustaining electrical circuit.

Provision is also made for an alarm system. The use of a simple timer is to be deprecated. The heating requirements of the person vary with the individual and his activity. Also the heat availability depends on various factors. Consideration must also be given to the possibility of the unit not having been fully charged originally. The alarm system includes a buzzer 51a (FIG. 5). In a preferred embodiment, the buzzer is actuated by closing of a microswitch 51. The microswitch is closed by means of arm 68 carried on the shaft 72 of the plate valve, so that when the amount of cold air being mixed with warm air falls below a predetermined ratio, the buzzer signals the user.

The position of the microswitch 51 may be changed by loosening screw 69 and repositioning supporting bracket 70 to determine the ratio of cold air to hot air at which the buzzer will be actuated. By providing this adjustment, the minimum safety factor warranted by the conditions peculiar to the operation may be provided. Obviously, other mechanical arrangements may be substituted.

In place of the system just described, a temperature sensitive switch, such as the conventional bimetallic element type, may be inserted in the hot air duct immediately upstream of the plate valve to actuate the buzzer whenever the temperature drops below some preset value.

Many commercially available bimetallic switches are provided with knobs which serve as convenient means for adjusting the operating point of the switch to any desired temperature within their range.

Heating subsystem

The heating subsystem comprises a composite unit which includes an electric heater, heat source, and heat transfer device. A sealed insulated vessel contains lithium hydride which acts as the heat source. The sealed lithium hydride vessel rejects heat to the enveloped air in thermostatically controlled quantities. An electric resistance element is sealed within the vessel and serves to heat the lithium hydride.

With this system, the heat is provided without dependence on combustion, chemical reaction or an electrochemical source.

It is recognized that lithium hydride and water react with considerable heat and energy release. Consideration is given to this possibility in the design of the heating unit. Moreover, the likelihood of free moisture in a subfreezing environment is remote. For complete assurance, however, the lithium hydride is contained within a hermetically sealed vessel.

Figure 2:
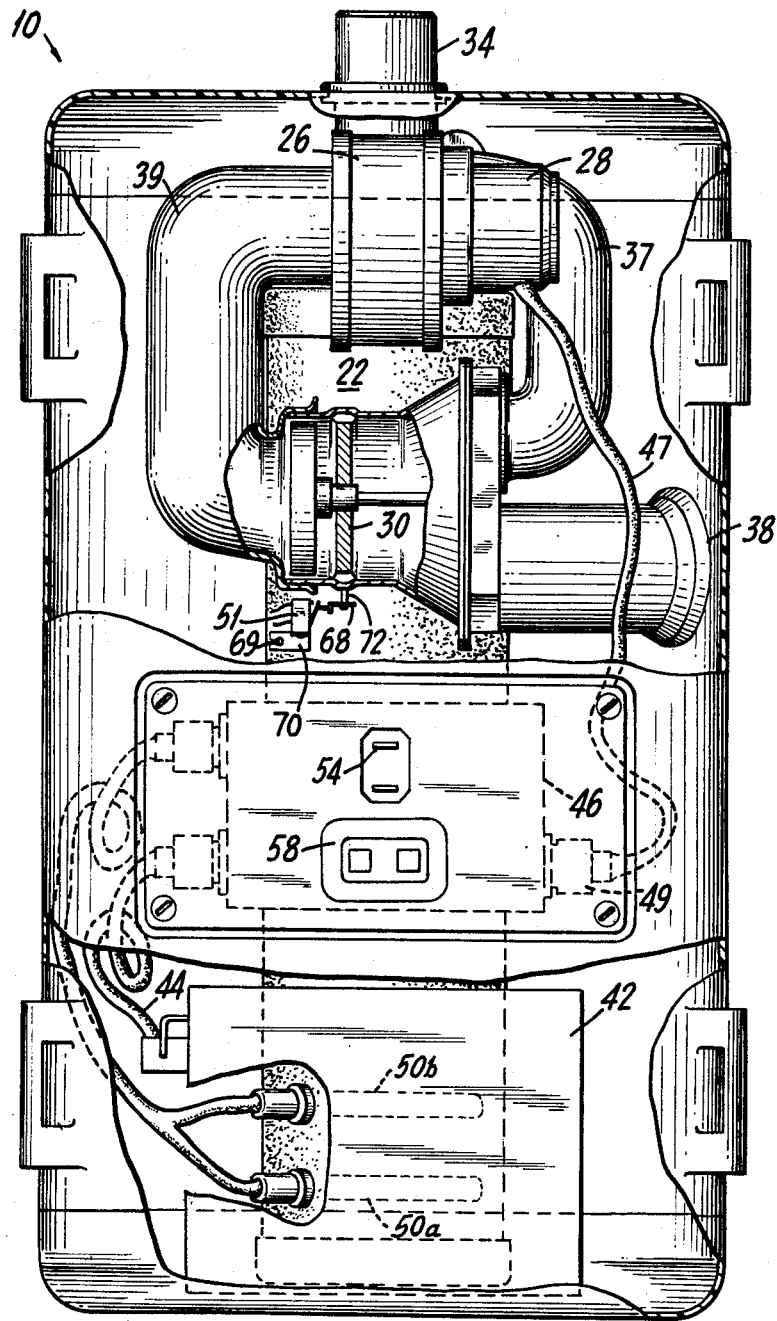
FIG. 2 is a rear elevation view with the case partially broken away.

Within the sealed container of lithium hydride there is provided a pair of sealed heating elements 50a, 50b, of the electrical resistance type. To charge the unit, switch 58 is opened to disable the blower and the unit plugged into a 115 v. D.C. source by means of recessed male plug 54 (FIG. 2). With switch 56 in the full charge position, current is permitted to flow to resistance elements 50a and 50b which are connected in parallel. For one particular application, the units were arranged to operate at a power load of 344 watts. For a 1 lb. load of lithium hydride, the recharge period at 68° F. ambient is one hour. at the end of this time, double-pole, double-throw switch 56 may be thrown to the sustained charge position in which the two resistance elements 50a and 50b are placed in series to provide sufficient heating to make up for losses to the ambient room atmosphere. This circuit is shown in FIG. 5.

Figure 6:
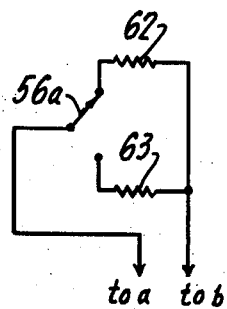
FIG. 6 is a wiring diagram of an alternative embodiment of part of the charging and sustaining electrical circuit.

An alternative embodiment is shown in FIG. 6, wherein a 344-watt charging element 62 and sustaining heating element 63 are provided with the switch 56a employed as a means of selection between the two units. Connection would be made to terminals "a," "b," in lieu of the circuit including 50a, 50b, and switch 56, shown connected to these terminals. During the charging of the heat exchanger, connection is also made through recessed male plug 54 and junction box 46 of FIG. 2 to battery 42 for purposes of recharging the battery. A conventional dropping resistor 43 (FIG. 5) is employed in series with the battery 42. If desired, the unit may be charged from an A.C. source, in which case a rectifier is required in series with the battery.

Air subsystem

The air subsystem describe is characterized by low weight and simplicity. The method of induction of the temperature conditioned air into the occupied sheltering garment 18 is superior to the conventional method of expelling it from the sheltering garment by the occupant's respiratory system. The average human respiration rate (in terms of air flow) is but 500 liters per hour. This is insufficient to carry the heat load into the garment at a reasonable air temperature. Also, the burden of respiration pumping of air into and out of the garment would detract from the efficiency of the occupant and in cases of extreme fatigue, this could represent the margin of survival. The electrical blower system supplies the air flow requirements and offers other important advantages:

(1) A constant fresh air supply eliminating the danger of carbon dioxide accumulation and promoting a maximum quantity of atmospheric oxygen for respiration.

(2) A high rate of air change serves to exhaust vapors and humidity from the garment for added comfort.

(3) A means of pressurization to "supercharge" the garment and prevent induction of ambient unconditioned air into the garment.

While there has been disclosed the best embodiment of the invention presently contemplated, there have been indicated various changes, omissions and additions which may be made therein, it will be apparent that various other changes, omissions and additions may be made in the invention without departing from the scope and spirit thereof.

What is claimed is:

1. A portable, body heating device for use under conditions of extreme cold comprising, in combination:
    (a) an enclosed, air tight, flexible suit adapted to be worn by a human being; and
    (b) a portable air heating unit adapted for the heating of air supplied to said suit, said unit comprising:
        (1) a heat conductive container;
        (2) lithium hydride stored in said container;
        (3) an electric heating element immersed in said lithium hydride, said element adapted to heat said lithium hydride above its melting point;
        (4) means to temporarily connect said heating element to a source of electrical energy;
        (5) means to pass air to be heated over said container in a heat transfer relationship so as to cool said lithium hydride below its freezing point and thereby release heat to said air; and
        (6) means to force the resultant heated air into said suit.

2. A portable heating pack adapted to be used with a sheltering garment, said pack comprising:
    (a) a hollow, walled casing having an outlet port;
    (b) first air inlet means secured proximate a wall of said casing whereby the air outside said casing is in communication with the interior of said casing;
    (c) heat storage means contained within said casing, said heat storage means comprising a generally cylindrical sealed container, a solid mass of lithium hydride, said mass being retained in said container, and heating means proximate said mass, said heating means adapted to transform said solid mass to the liquid state within said container, said heating means comprising at least one electric resistance type heating element disposed within said sealed container and in contact with said lithium hydride, and electric input means communicating with said heating elements and adapted to be connected to an external source of electrical power;

(d) second air inlet means in communication with both the exterior air and the air in the interior of said casing;
(e) thermostatic mixing means adapted to mix said heated air from said first air inlet means with air from said second inlet means;
(f) pump means adapted to transfer said mixed air from said thermostatic mixing means and to expel said air from said outlet port, said outlet port being adapted for connection to the interior of the sheltering garment;
(g) a first air duct surrounding said container, said first air duct communicating with said first inlet port whereby air within said duct is adapted to be heated by said container; and
(h) a second air duct communicating with said second air inlet port and said mixing means and wherein said pump means comprises:
   (1) a storage battery within said pack,
   (2) an electric blower contained within said pack and powered by said battery, said blower being in communication with said mixing means, and
   (3) an air outlet duct extending between said blower and said outlet port whereby said air in said mixing means is introduced into said sheltering garment.

References Cited by the Examiner
UNITED STATES PATENTS

| | | | |
|---|---|---|---|
| Re. 21,154 | 7/39 | Kingsland | 165—16 |
| 2,610,038 | 9/52 | Phillips | 128—146 X |
| 2,692,234 | 10/54 | Insinger | 252—71 |
| 2,723,083 | 11/55 | Bary | 165—118 X |
| 2,911,513 | 11/59 | MacCracken | 165—185 X |
| 3,064,448 | 11/62 | Whittington | 128—144 X |

RICHARD A. GAUDET, *Primary Examiner.*
JORDAN FRANKLIN, *Examiner.*